United States Patent
Savchenko

(12) 
(10) Patent No.: US 6,434,284 B1
(45) Date of Patent: Aug. 13, 2002

(54) BEAM CONVERTER FOR ENHANCING BRIGHTNESS OF POLARIZED LIGHT SOURCES

(75) Inventor: Arthur Y. Savchenko, Corning, NY (US)

(73) Assignee: Corning Incorporated, Corning, NY (US)

( * ) Notice: Subject to any disclaimer, the term of this patent is extended or adjusted under 35 U.S.C. 154(b) by 75 days.

(21) Appl. No.: 09/732,165

(22) Filed: Dec. 7, 2000

(51) Int. Cl.$^7$ .................................................. G02B 6/00
(52) U.S. Cl. ......................................... 385/11; 359/483
(58) Field of Search .............................. 385/11, 15, 31; 359/437, 439, 440, 483, 485, 496

(56) References Cited

U.S. PATENT DOCUMENTS

| | | | | |
|---|---|---|---|---|
| 4,878,747 A | * | 11/1989 | Sting et al. ................. | 350/511 |
| 5,319,528 A | * | 6/1994 | Raven .......................... | 362/32 |
| 5,394,270 A | * | 2/1995 | Sturm .......................... | 359/636 |
| 6,373,631 B1 | * | 4/2002 | Huang et al. ................. | 385/11 |

OTHER PUBLICATIONS

"Fiber–bundle coupled, diode end–pumped Nd: YAG laser", J. Berger, D.F. Welch, W. Streifer, D.R. Scifres, N.J. Hoffman, J.J. Smith, and D. Radecki, Optics Letters, vol. 13, No. 4, Apr. 1998, pp. 306–308.

"Geometrical Transformation of Linear Diode–Laser Arrays for Longitudinal Pumping of Solid–State Lasers", J.R. Leger and W.C. Goltsos, IEEE Journal of Quantum Electronics, vol. 28, No. 4, Apr. 1992, pp. 1088–1100.

"Laser diode to fiber coupling using anamorphic gradient–index lenses", J.M. Stagaman and D.T. Moore, Applied Optics, vol. 23, No. 11, Jun. 1, 1984, pp. 1730–1734.

* cited by examiner

*Primary Examiner*—Hung Xuan Dang
(74) *Attorney, Agent, or Firm*—Eugene Stephens & Associates

(57) ABSTRACT

Linearly polarized light beams emanating from elongated spot sources are reshaped to couple more efficiently into optical waveguides having circular or other less elongated entrances. A polarization rotator interrupts one-half of the beam along its wider dimension to rotate the polarization direction of a first transverse segment of the beam through 90 degrees with respect to the original polarization direction of a second transverse segment of the beam. A polarization-sensitive beam displacer relatively displaces the two beam segments into positions of overlap that effectively shorten the wider dimension of the spot source while increasing brightness within the region of overlap.

42 Claims, 1 Drawing Sheet

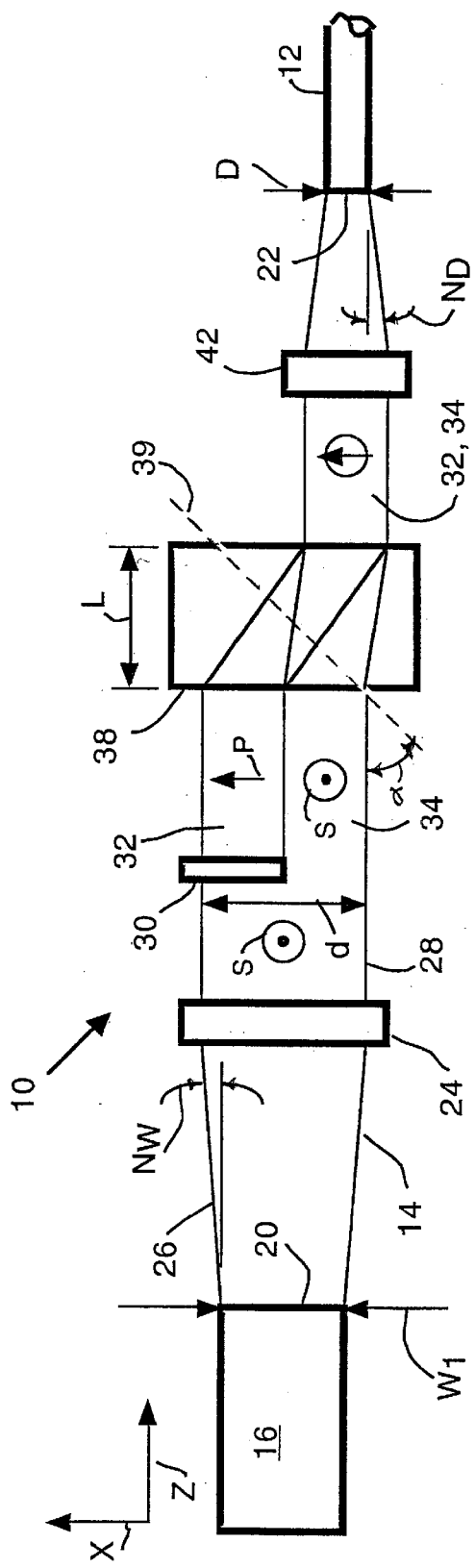
FIG. 1
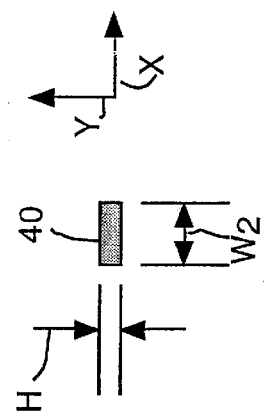
FIG. 4
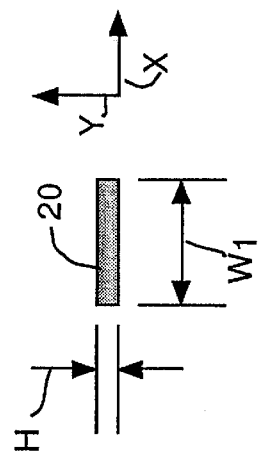
FIG. 3
FIG. 2

BEAM CONVERTER FOR ENHANCING BRIGHTNESS OF POLARIZED LIGHT SOURCES

TECHNICAL FIELD

This invention relates to the field of devices for coupling light from light sources into waveguides, and more particularly to beam converters and beam shapers.

BACKGROUND

Coupling and pumping efficiencies between illumination sources and optical waveguides, including solid state and fiber lasers, depend in part on how evenly the waveguides are filled by light from the illumination sources. Intermediate light beam transformations resolve beam quality in two orthogonal directions to achieve more even illumination of the waveguides.

Certain lasers emit beams originating from spot sources having shapes that depart from circularity. For example, diode lasers, on account of their planar geometry, typically emit beams originating from spot shapes that are elongated along one orthogonal axis with respect to the other. The short axis can have a height dimension that is almost diffraction limited, while the long axis can have a width dimension many times the diffraction limit. A convenient way to characterize the beam dimensions is by "beam quality factor", which is the product of the height or width dimension of the spot source times the numerical aperture of the spot source along the same axis. Beam quality factors in a ratio of 20 to 1 or higher are possible.

Waveguides, such as multimode fibers, generally contain circular transverse sections. Light coupled into the waveguides must be within area dimensions and numerical apertures of the circular waveguides' entrances. Focusing optics image the light sources onto the waveguides' entrances. However, the elongated spot source shapes of lasers, such as diode lasers, often do not fit within the entrance parameters of the waveguides or fill only a portion of the waveguides' entrances, either of which reduces coupling efficiency.

Anamorphic and other complex focusing optics have been used to couple the light more efficiently by focusing the light differently along the two orthogonal axes. However, the width dimension of the elongated spot sources can be reduced only to the extent that the numerical aperture along the long axis of the spot sources can be effectively increased. The height dimension of the elongated spot sources can be increased only to the extent the numerical aperture along the short axis of the spot sources can be effectively reduced. Some losses are still apparent in focusing systems where even the best compromises in the two orthogonal directions do not fit within the area dimensions and numerical apertures of the waveguide entrances.

Although such geometric optical solutions assure that more rays from the illumination source reach the waveguide entrances within their numerical apertures, the uneven distribution of radiant energy in the two orthogonal directions remains unchanged. The cost of anamorphic and other complex focusing optics is quite high, and the diffraction images of the spot sources can be made worse by the generation of additional unwanted modes.

Regardless of their complexity, the focusing systems are incapable of increasing the radiance of the light distribution imaged onto the waveguide entrances. The concentration of light within a less elongated spot shape would involve an increase in brightness. The Radiance Theorem forbids imaging systems to increase in the number of photons per solid angle per effective area of the beam (assuming the object and image spaces have the same index of refraction).

SUMMARY OF INVENTION

A characteristic of elongated-shaped source beams, particularly those emitted by planar waveguide light sources, is a well-defined linear polarization. Typically, the electric field vector of such beams is oriented perpendicular to the long axes of the beams. My invention (among its embodiments) utilizes this polarization characteristic to effectively foreshorten the elongated dimension of the source beams. For example, two sections of an elongated beam can be divided into different orthogonal linear polarizations and effectively folded together along the beam's long axis to increase brightness while reducing the apparent spot size of the source beam to one-half of its original size.

Both the increase in brightness and the improvement in the spot shape of the source beam can be accomplished at low cost and within a relatively small space. Circular or elliptical entrances of optical waveguides can be more evenly filled by the reshaped source beams for increasing coupling efficiencies between light sources and fiber transmission systems or pumping efficiencies between the light sources and optical amplifiers. The invention provides for depositing optical power from light sources into more compact regions of space and can be utilized in other situations where such brightness or beam shaping improvements are needed.

An exemplary beam converter arranged in accordance with my invention functions as an intra-beam polarization multiplexer. A linearly polarized beam having an initial transverse area propagates along an optical pathway within the converter. A polarization rotator interrupts a first transverse segment of the propagating beam for changing polarity of the first transverse segment of the beam with respect to a second transverse segment of the beam. A polarization-sensitive beam displacer combines at least portions of the first and second transverse segments of the beam within a common transverse area for enhancing brightness of the beam.

Preferably, the polarization rotator rotates polarity of the first transverse segment of the beam to a linear polarization that is orthogonal to the linear polarization of the second transverse segment of the beam. For example, the polarization rotator can be a retarder that delays a component of the first transverse segment of the beam for changing the polarity of the first transverse segment of the beam through 90 degrees with respect to the second transverse segment of the beam. A half-wave retardation plate having principal axes oriented at 45 degrees to the original polarization direction can be used to accomplish this.

Within the initial transverse area of the beam, long and short orthogonal axes are defined. The beam has a greater width along the long axis than along the short axis. The polarization rotator splits the long axis of the beam between the two transverse segments. The polarization-sensitive beam displacer laterally displaces one of the first and second transverse segments of the beam with respect to the other of the first and second transverse segments of the beam along the long axis so that the first and second transverse segments at least partially overlap. The displacement does not change the direction of propagation, so both of the original segments of the beam occupy a common region of space within which the radiance of the beam is increased.

Preferably, the polarization-sensitive beam displacer is a polarizer, such as a birefringent crystal. A calcite or similar crystal having a higher refractive index for polarization in a plane of incidence can be used to refract the two segments of the beam by different amounts according to their polarization. The result is a lateral shift of one beam segment with respect to the other. However, since the two beam segments are initially distinguished laterally, the lateral shift has the effect of overlapping the two beam segments. Dimensions of the crystal can be set to maximize the amount of overlap.

An exemplary system for optically coupling or optically pumping a waveguide with a source beam of linearly polarized light according to my invention includes a source that emits the beam of linearly polarized light from a spot source having area and numerical aperture dimensions along two orthogonal axes normal to a direction of propagation. The waveguide receives the beam of linearly polarized light through an entrance having area and numerical aperture dimensions along the two orthogonal axes that differ in at least one dimension from the corresponding dimensions of the spot source. A polarization rotator relatively rotates a polarization direction of a first transverse segment of the beam with respect to a polarization direction of a second transverse segment of the beam. A polarization-sensitive beam displacer relatively displaces the first and second transverse segments of the beam in a direction that modifies one of the area dimensions of the spot source. Imaging optics image the modified spot source onto the entrance of the waveguide within area and numerical aperture dimensions that would not be possible to achieve by similarly imaging the original spot source.

In a particularly useful application, the spot source has a width dimension along a first of the two orthogonal axes that is larger than a height dimension along a second of the two orthogonal axes, and a corresponding width dimension of the waveguide entrance along the first orthogonal axis is smaller than the width dimension of the spot source. The two polarization directions preferably correspond to the two orthogonal axes. The polarization-sensitive beam displacer relatively displaces the first and second transverse segments along the first orthogonal axis so that the modified spot source has a width dimension along the first orthogonal axis that is smaller than the width dimension of the original spot source. When imaged, the modified spot source better fits within the area and numerical aperture dimensions of the waveguide entrance.

Preferably, the polarization-sensitive beam displacer is a polarizer that is oriented with respect to two directions of polarization so that the two transverse segments are separately transmitted through the polarizer as ordinary and extraordinary beams. The polarization rotator is preferably a retarder that is oriented with respect to an initial polarization direction of the beam of linearly polarized light so that the polarization directions of the two transverse segments differ by 90 degrees. The retarder interrupts and divides the beam of linearly polarized light into the two transverse segments.

For purposes of increasing brightness, the polarization-sensitive beam displacer relatively displaces the first and second transverse segments in a direction that overlaps at least portions of the two transverse segments in a common direction of propagation. The area of the modified spot source is smaller than the area of the original spot source, while numerical apertures of the two spot sources are substantially the same. The increase in brightness does not violate the Radiance Theorem or produce interference because the overlapping beam segments have orthogonal linear polarizations.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 1 is a diagram of an optical system including a beam converter for enhancing brightness of a linearly polarized beam.

FIG. 2 is a diagram of a light source found in FIG. 1 but viewed from an orthogonal direction to depict additional dimensions.

FIG. 3 is an end view of a spot source of the linearly polarized beam.

FIG. 4 is an end view of a modified spot source having a width dimension reduced by one-half producing a two-fold increase in brightness.

DETAILED DESCRIPTION OF THE DRAWINGS

Reference will now be made in detail to the present preferred embodiment of the invention, an example of which is illustrated in the accompanying drawings. Wherever possible, the same reference numbers will be used throughout the drawings to refer to the same or like parts.

An optical system 10 for optically coupling or optically pumping a waveguide 12 with a source beam 14 of linearly polarized light is shown in FIG. 1. The waveguide 12 can be an optical fiber, such as a multimode fiber, or an optical device, such as a solid state or fiber laser.

A light source 16, such as a diode laser, emits the beam 14 of linearly polarized light from a spot source 20 having area dimensions of height "H" and width "$W_1$" and corresponding maximum exit angle dimensions "$N_H$" and "$N_W$" along two orthogonal axes "X", "Y" normal to a direction "Z" of beam propagation. The emitted beam 14 has an initial "S" polarization that extends along the "Y" axis in the height dimension of the spot source 20.

The exit angle dimension "$N_W$" linked to the much larger width dimension "$W_1$" is considerably smaller than the exit angle dimension "$N_H$" linked to the much smaller height dimension "H" because the width dimension "$W_1$" is produced by many more overlapping modes. Actual height dimensions "H" can approach a diffraction limit near one micron, while actual width dimensions "$W_1$" can exceed the height dimensions "H" by a factor of 200 or more. The corresponding numerical apertures of the exit angles typically measure in the vicinity of 0.1 for the exit angle "$N_H$" and 0.6 for the exit angle "$N_W$".

A circular entrance 22 of the waveguide 12 onto which the spot source 20 is eventually imaged has an area dimension of diameter "D" and a maximum entrance angle dimension "$N_D$", which are both symmetric to the orthogonal axes "X" and "Y". Generally, the diameter dimension "D" of the waveguide entrance 22 is larger than the height dimension "H" and smaller than the width dimension "$W_1$" of the spot source 20. However, the entrance angle dimension "$N_D$" is generally smaller than the exit angle dimension "$N_H$" and larger than the exit angle dimension "$N_W$".

A collimator 24 which can have different focal power along the two orthogonal axes "X" and "Y" converts the linearly polarized beam 14 from a diverging beam 26 to a parallel beam 28. A retarder 30 in the form of a half-wave retardation plate interrupts the parallel beam 28, divides the parallel beam 28 into a first beam segment 32 and a second beam segment 34, and rotates the polarization direction of the first beam segment 32 through 90 degrees with respect to the polarization direction of the second beam segment 34. Following the retarder 30, the first beam segment 32 exhibits a "P" polarization that extends along the "X" axis, and the second beam segment 34 retains an "S" direction of polarization extending along the "Y" axis.

The two beam segments 32 and 34 occupy contiguous regions along the "X" axis and are evenly bifurcated into the contiguous regions by the "Y" axis. A polarizer 38 in the form of a birefringent crystal such as calcite is oriented with respect to two polarization directions "S" and "P" so that the two beam segments 32 and 34 are refracted by different amounts. The beam segment 32 is refracted by the polarizer 38 more than the beam segment 34. Accordingly, the beam segment 32 is transmitted through the polarizer 38 as a so-called "extraordinary" beam, and the beam segment 34 is transmitted through the polarizer 38 as a so-called "ordinary" beam, consistent with current naming conventions.

The two beam segments 32 and 34 emerge from the polarizer 38 in the same direction of propagation along the "Z" axis. However, the additional refraction undergone by the beam segment 32 shifts the emerging beam segment 32 along the "X" axis into a position of coincidence with the emerging beam segment 34. The exemplary polarizing crystal has an optical axis 39 inclined to the direction of beam propagation through an angle "α" of 45 degrees. The thickness dimension "L" of the crystal required to entirely overlap the two beam segments 32 and 34 is given by the following equation:

$$L = \frac{d\, n_e\, n_o}{n_e^2 - n_o^2}$$

where "d" is the width of the parallel beam 28 (including its two component segments 32 and 34) and "$n_o$" and "$n_e$" are indices of refraction for the ordinary and extraordinary beams. Typically, the length "L" is about five times the width "d" of the beam.

Within the region of overlap between the two beam segments 32 and 34, beam brightness is increased. That is, the actual number of photons per unit area per unit solid angle is increased. Light is not lost due to interference effects, because the two beam segments 32 and 34 are orthogonally polarized.

The combining of the beam segments 32 and 34 also has the effect of producing a modified spot source 40 having a width dimension "$W_2$" along the "X" axis that is reduced by one-half with respect to the width dimension "$W_1$" of the original spot source 20 without significantly affecting the height dimension "H" or exit angle dimensions "$N_W$" and "$N_H$".

Imaging optics 42 image the modified spot source 40 onto the entrance 22 of the waveguide 12 within area and entrance angle (i.e., numerical aperture) dimensions "D" and "$N_D$" that would not be possible to achieve by similarly imaging the original spot source 20. Reducing the width dimension "W1" to "W2" by one-half allows the imaging system to more evenly distribute light energy within the waveguide entrance between the two orthogonal directions "X" and "Y". Coupling or pumping efficiencies between the light source 16 and the waveguide 12 can be improved beyond what would be possible by optimizing focusing parameters alone.

Although the entrance 22 of the waveguide 12 is circular, as is commonplace for optical fibers, the invention can be adapted to other waveguide entrance shapes including elliptical or rectangular. The shape of the original spot source 20 and the initial direction of polarization can also vary. The initial polarization can be adjusted together with the positions and orientations of the retarder 30 and polarizer 38 to control the direction of the relative shift between the beam segments 32 and 34. The thickness "L" or other comparable parameter of the polarizer 38 can be adjusted to control the amount of shift between the beam segments 32 and 34. Together these adjustments can be used to change both the shape and the area of the modified spot source 40 with respect to the original spot source 20.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

I claim:

1. A beam converter comprising:
   an optical pathway along which a linearly polarized beam having an initial transverse area propagates;
   a polarization rotator in the path of a first transverse segment of the beam, whereby the polarity of the first transverse segment of the beam will be rotated with respect to the polarity of a second transverse segment of the beam; and
   a polarization-sensitive beam displacer in the path of at least portions of the first and second transverse segments of the beam so as to combine said portions within a common transverse area.

2. The beam converter of claim 1 in which the polarization rotator is capable of changing polarity of the first transverse segment of the beam to a linear polarization that is orthogonal to the linear polarization of the second transverse segment of the beam.

3. The beam converter of claim 2 in which the polarization rotator is a retarder.

4. The beam converter of claim 1 in which the polarization-sensitive beam displacer laterally displaces one of the first and second transverse segments of the beam with respect to the other of the first and second transverse segments of the beam so that the first and second transverse segments at least partially overlap in the same direction of propagation.

5. The beam converter of claim 4 in which the polarization-sensitive beam displacer is a polarizer.

6. The beam converter of claim 5 in which the polarizer is a birefringent crystal.

7. The beam converter of claim 1 further comprising a collimator located in advance of the polarization rotator along the optical pathway.

8. The beam converter of claim 1 in which the initial transverse area of the beam has a width along a first orthogonal axis that is larger than a height along a second orthogonal axis.

9. The beam converter of claim 8 in which the first and second transverse segments are distinguished along the first orthogonal axis.

10. The beam converter of claim 9 in which the polarization-sensitive beam displacer relatively shifts the first and second transverse segments along the first orthogonal axis.

11. The beam converter of claim 10 in which the first and second transverse segments of the beam have linear polarizations aligned with the first and second orthogonal axes.

12. A beam shaper for reshaping a linearly polarized light beam having dimensions along two orthogonal axes in a transverse plane normal to a direction of beam propagation comprising:
   a polarization rotator that relatively rotates a polarization direction of a first transverse segment of the beam with respect to a polarization direction of a second transverse segment of the beam;
   the first transverse segment of the beam being spatially distinguished from the second transverse segment of the beam along one of the two orthogonal axes; and
   a polarization-sensitive beam displacer that relatively displaces the first and second transverse segments of the beam in a direction that shortens one of the orthogonal dimensions of the beam.

13. The beam shaper of claim 12 in which the two orthogonal axes include a long axis and a short axis and the beam; and prior to the polarization rotator, the beam has a width dimension along the long axis that is larger than a height dimension along the short axis.

14. The beam shaper of claim 13 in which the first and second transverse segments of the beam are distinguished from each other along the long axis.

15. The beam shaper of claim 14 in which the polarization-sensitive beam displacer relatively shifts the first and second transverse segments along the long axis.

16. The beam shaper of claim 15 in which the polarization-sensitive beam displacer overlaps the first and second segments of the beam along the long axis to increase brightness of the beam.

17. The beam shaper of claim 16 in which the first and second transverse segments of the beam have linear polarizations aligned with the two orthogonal axes.

18. The beam shaper of claim 12 in which the polarization rotator relatively rotates the polarization direction of the first transverse segment through 90 degrees with respect to the second transverse segment.

19. The beam shaper of claim 18 in which the polarization rotator interrupts the linearly polarized beam for dividing the beam into the two transverse segments.

20. The beam shaper of claim 18 in which the polarization rotator is a retarder.

21. The beam shaper of claim 20 in which the retarder is a birefringent crystal.

22. A system for optically coupling or optically pumping a waveguide with a source beam of linearly polarized light comprising:
   a source that emits the beam of linearly polarized light from a spot source having area and numerical aperture dimensions along two orthogonal axes normal to a direction of propagation;
   a waveguide that receives the beam of linearly polarized light through an entrance having area and numerical aperture dimensions along the two orthogonal axes that differ in at least one dimension from the corresponding dimensions of the spot source;
   a polarization rotator that relatively rotates a polarization direction of a first transverse segment of the beam with respect to a polarization direction of a second transverse segment of the beam;
   a polarization-sensitive beam displacer that relatively displaces the first and second transverse segments of the beam in a direction that modifies one of the area dimensions of the spot source; and
   imaging optics that image the modified spot source onto the entrance of the waveguide within area and numerical aperture dimensions that would not be possible to achieve by similarly imaging the spot source.

23. The system of claim 22 in which the spot source has a width dimension along a first of the two orthogonal axes that is larger than a height dimension along a second of the two orthogonal axes.

24. The system of claim 23 in which a corresponding width dimension of the waveguide entrance along the first orthogonal axis is smaller than the width dimension of the spot source.

25. The system of claim 24 in which the two polarization directions correspond to the two orthogonal axes.

26. The system of claim 25 in which the polarization-sensitive beam displacer relatively displaces the first and second transverse segments along the first orthogonal axis so that the modified spot source has a width dimension along the first orthogonal axis that is smaller than the width dimension of the spot source.

27. The system of claim 22 in which the polarization-sensitive beam displacer is a polarizer that is oriented with respect to two directions of polarization so that the two transverse segments are separately transmitted through the polarizer as ordinary and extraordinary beams.

28. The system of claim 27 in which the two transverse segments encounter different refractive indices through the polarizer.

29. The system of claim 27 in which the polarization rotator is a retarder that is oriented with respect to an initial polarization direction of the beam of linearly polarized light so that the polarization directions of the two transverse segments differ by 90 degrees.

30. The system of claim 29 in which the polarization rotator interrupts and divides the beam of linearly polarized light into the two transverse segments.

31. The system of claim 22 in which the polarization-sensitive beam displacer relatively displaces the first and second transverse segments in a direction that overlaps at least portions of the two transverse segments in a common direction of propagation for increasing beam brightness.

32. The system of claim 31 in which the area of the modified spot source is smaller than the area of the spot source, while numerical apertures of the two spot sources are substantially the same.

33. The system of claim 22 further comprising a collimator for collimating the linearly polarized beam in advance of the polarization rotator.

34. A method of increasing beam brightness using intra-beam polarization multiplexing comprising the steps of:
   propagating a beam of linearly polarized light along an optical pathway;
   relatively rotating a polarization direction of a first transverse segment of the beam with respect to a polarization direction of a second transverse segment of the beam; and
   relatively displacing the first and second transverse segments of the beam into positions that overlap in a common direction of beam propagation for enhancing brightness of the beam.

35. The method of claim 34 including the further step of dividing the beam of linearly polarized light into the two transverse segments that occupy different positions along a first of two orthogonal axes normal to the direction of propagation.

36. The method of claim 35 including the further step of aligning the polarization direction of one of the transverse segments with the first orthogonal axis.

37. The method of claim 36 in which said step of relatively displacing includes laterally shifting one of the transverse segments with respect to the other along the first orthogonal axis.

38. The method of claim 36 in which said step of relatively displacing includes transmitting one of the two transverse segments through a polarizer as an ordinary beam and the other of the two transverse segments as an extraordinary beam.

39. The method of claim 37 in which the beam of linearly polarized light emanates from a spot source having a width dimension along the first axis orthogonal axis that is larger than a height dimension along a second of the orthogonal axes.

40. The method of claim 39 in which the step of relatively displacing includes combining the two transverse segments to produce a modified spot source having a width dimension along the first orthogonal axis that is shorter than the width dimension of the spot source.

41. The method of claim 34 in which said step of relatively rotating includes relatively rotating the polarization direction of the first transverse segment of the beam with respect to the polarization direction of the second transverse segment of the beam through 90 degrees.

42. The method of claim 41 in which said step of propagating the beam of linearly polarized light along an optical pathway includes collimating the beam in advance of the step of relatively rotating the polarization directions of the two transverse segments.

* * * * *